United States Patent

Yoshida et al.

[11] Patent Number: 5,113,473
[45] Date of Patent: May 12, 1992

[54] NONLINEAR, OPTICAL THIN-FILMS AND MANUFACTURING METHOD THEREOF

[75] Inventors: Masaru Yoshida, Hyogo; Yoshio Manabe, Katano; Tsuneo Mitsuyu, Hirakata; Ichiro Tanahashi, both of Hirakata, Japan

[73] Assignee: Matsushita Electric Industrial Co., Ltd., Osaka, Japan

[21] Appl. No.: 752,988

[22] Filed: Sep. 3, 1991

Related U.S. Application Data

[63] Continuation of Ser. No. 617,885, Nov. 26, 1990, abandoned.

Foreign Application Priority Data

Nov. 24, 1989 [JP] Japan .................. 1-305441

[51] Int. Cl.⁵ .......... G02B 6/10; H03F 7/00; H01L 21/225; C23C 14/00
[52] U.S. Cl. ................. 385/131; 385/122; 359/332; 437/160; 204/192.1; 204/192.25; 204/192.26
[58] Field of Search ........... 350/96.11, 96.12, 96.30, 350/96.34, 320; 307/425, 428, 430; 204/192.1, 192.11, 192.25, 192.26; 437/51, 160, 164; 385/14, 130, 131, 122; 359/328, 330, 332

[56] References Cited

U.S. PATENT DOCUMENTS

| | | | |
|---|---|---|---|
| 3,934,061 | 1/1976 | Keck et al. | 350/96.12 X |
| 4,189,521 | 2/1980 | Glass et al. | 350/96.34 X |
| 4,206,251 | 6/1980 | Chen | 350/96.12 |
| 4,680,045 | 7/1987 | Osafune et al. | 350/96.34 X |
| 4,796,971 | 1/1989 | Robello et al. | 350/96.34 |
| 4,818,616 | 4/1989 | Milverton et al. | 350/96.34 X |
| 4,861,129 | 8/1989 | Che et al. | 350/96.34 X |
| 4,877,298 | 10/1989 | Teng et al. | 307/430 X |
| 4,886,339 | 12/1989 | Scozzafava et al. | 350/96.34 |
| 5,013,129 | 5/1991 | Harada et al. | 307/430 X |

OTHER PUBLICATIONS

Jain et al., "J. Opt. Soc. Am." 73 647 May (1983).
Jerominek et al., "J. Appl. Phys." 63 957 Feb. (1988).

*Primary Examiner*—Brian Healy
*Attorney, Agent, or Firm*—Wenderoth, Lind & Ponack

[57] ABSTRACT

Nonlinear, optical thin-films comprising a plurality of island structures of semiconductor ultra-fine particles and a plurality of continuous films of an optically transparent material, said island structures and said continuous films being applied alternately on a substrate. A method for manufacturing nonlinear, optical thin-films comprising the steps of: (a) providing a substrate; (b) depositing an island structure of semiconductor ultra-fine particles on the substrate or a continuous film; and (c) depositing the continuous film of optically transparent substance on the island structure; (d) the steps (b) and (c) of depositing an island structure and the continuous film being performed alternately.

9 Claims, 2 Drawing Sheets

NONLINEAR, OPTICAL THIN-FILMS AND MANUFACTURING METHOD THEREOF

This application is a continuation of now abandoned application Ser. No. 07/617,885, filed Nov. 26, 1990.

BACKGROUND OF THE INVENTION

1. Field of the Invention

The present invention relates to nonlinear, optical thin-films which can be used for optical devices such as an optical switch and an optical harmonic generator which make use of a nonlinear optical effect and a manufacturing method thereof.

2. Description of Related Art

A cut-off filter glass made by doping a semiconductor $CdS_xSe_{1-x}$ in borosilicate glass is one of bulk nonlinear, optical materials, as described in for example J. Opt. Soc. Am. 73, 647(1983).

The cut-off filter glass is prepared by putting $CdS_xSe_{1-x}$ and borosilicate glass material in a platinum crucible to melt them at a high temperature of about 1,600° C.

However, the manufacturing method for a bulk nonlinear, optical material, as in case of manufacturing the cut-off filter glass, has the following problems: (a) The kind of a semiconductor to be doped is limited severely because the material needs to be melted at a high temperature. (A semiconductor having a low melting point will usually be evaporated, decomposed or oxidized.) (b) The amount of doping is limited. For example, it is difficult to disperse more than two to four weight percent of $CdS_xSe_{1-x}$ in borosilicate glass. (c) In order to obtain fine particles, the melt is cooled rapidly and then the solid is subjected to thermal treatment. However, the control of the particle diameter is difficult because the particles grow randomly. (d) On manufacturing a nonlinear, optical device, it is necessary to form a thin film-like shape. However, it is difficult to form such a shape.

SUMMARY OF THE INVENTION

It is an object of the present invention to provide a nonlinear optical material doped by a high density of semiconductor ultra-fine particles of uniform size homogeneously.

It is another object of the present invention to provide a manufacturing method of a nonlinear optical material doped easily at a high density of semiconductor ultra-fine particles of uniform size homogeneously.

Nonlinear, optical thin films according to the present invention comprises a plurality of island structures of semiconductor ultra-fine particles and a plurality of continuous films of an optically transparent material, the island structure and the continuous films being applied alternately on a substrate.

A method for manufacturing nonlinear, optical thin-films according to the present invention comprises the steps of: (a) providing a substrate; (b) depositing an island structure of semiconductor ultra-fine particles on the substrate or a continuous film; and (c) depositing the continuous film of optically transparent substance on the island structure; (d) the steps (b) and (c) of depositing an island structure and the continuous film being performed alternately.

It is an advantage of nonlinear, optical thin-films according to the present invention that the nonlinear, optical thin-films have large nonlinear optic effect.

It is an advantage of a manufacturing method according to the present invention that semiconductor ultra-fine particles of uniform size can be doped easily in optically transparent substance at a high density homogeneously.

BRIEF DESCRIPTION OF THE DRAWINGS

Further objects and advantages of the present invention will be apparent from the following description. Reference is made to the accompanying drawings, wherein preferred embodiments of the present invention are clearly shown.

Figure 1:
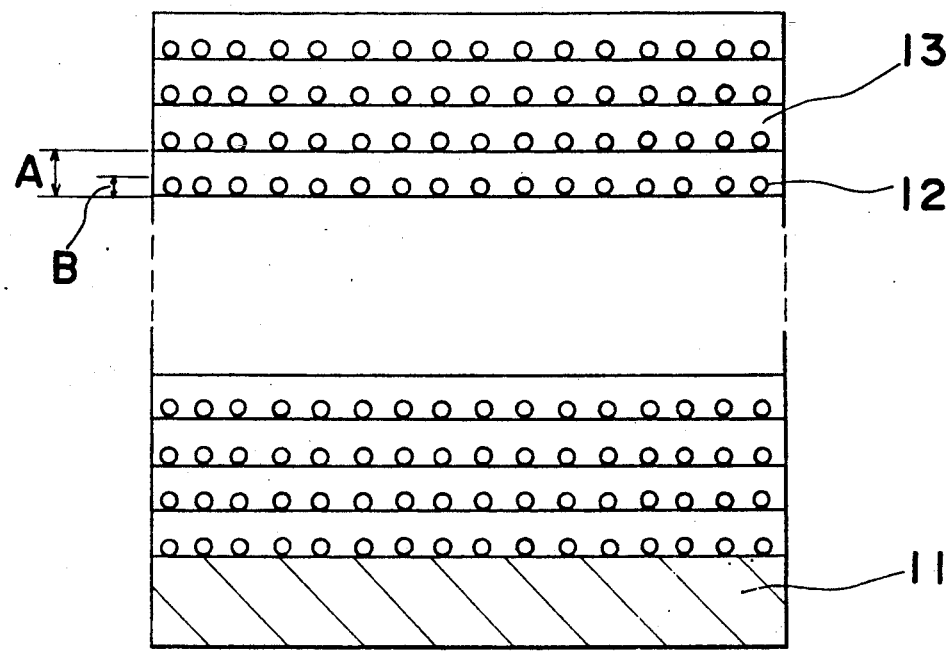
FIG. 1 is a schematic sectional view which shows the structure of a nonlinear, optical thin-films.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be constructed as encompassing all the features of patentable novelty that reside in the present invention, including all features that would be treated as equivalents thereof by those skilled in the art to which the present invention pertains.

DETAILED DESCRIPTION OF THE PREFERRED EMBODIMENT

Referring now to the drawings, the present invention will be explained in detail.

FIG. 1 shows the structure of nonlinear, optical thin-films according to the present invention, wherein semiconductor ultra-fine particles 12 to be grown as an island structure and optically transparent substance 13 are deposited alternately.

It is preferable that a length A and a length B satisfy a relation $A \leq B$, wherein the length A is a length of a semiconductor ultra-fine particle 12 grown as an island, and the length B is a length of the optically transparent substance 13 grown as a continuous film both measured in a direction perpendicular to the plane of a substrate 11, because advantages of the present invention become more remarkable.

It is necessary that the size of the semiconductor ultra-fine particle be larger than the Bohr radius of excitons while being small enough for the quantum size effect to become remarkable. Thus, a size of an ultra-fine particle of the order of a few to a few tens nanometers is appropriate.

The optically transparent substance 13 is a substance which is transparent optically in a wavelength range necessary to obtain the nonlinear optical effect.

An island structure formed in the very initial stage of manufacturing a semiconductor thin film is found to consist of ultra-fine particles. Nonlinear, optical thin-films according to the present invention make use of island structure material positively as semiconductor ultra-fine particles for doping in an optically transparent substance 13.

One of the characteristics of the manufacturing method of nonlinear, optical thin-films according to the present invention is that semiconductor ultra-fine particles 12 can be doped homogeneously in the optically transparent substance 13 in a state wherein the sizes of particles are made nearly uniform.

The reason why semiconductor ultra-fine particles 12 of uniform particle size can be doped homogeneously will be explained below.

When a crystalline thin film is grown on a substrate 11, the initial process of the growth of thin film can be classified in the following three stages: (a) nucleation, (b) agglomeration of nuclei and generation of an island structure, and (c) growth of the island structure and formation of a continuous film.

A particle which arrives from an evaporation source to the substrate 11 will lose energy in a direction perpendicular to the substrate 11 in a short time and will remain on the substrate 11 if the energy of the particle is not so large. However, when an evaporated particle arrives at the substrate 11, it is not in thermal equilibrium generally because a transition between the gas and solid phases should occur. Thus, it moves around on the surface and is captured at an absorption point such as a defect on the surface of the substrate 11 so as to be fixed on the substrate 11. If there is no absorption point available, it evaporates again. When evaporated particles arrive one after another, particles are fixed on the substrate near each other to become a crystal nucleus.

After crystal nuclei are formed, they grow to form an island structure. Further, a plurality of islands combines in a process similar to sintering so that islands grow larger and a continuous film is formed.

In this invention, the growth is stopped when islands are formed in the early stage of thin film growth explained above, so as to disperse semiconductor ultra-fine particles 12 of island structure on the substrate 11. Then, a thin film of optically transparent substance 13 is applied to the substrate 11. By covering the entire face of the island structure of semiconductor ultra-fine particles 12 by an optically transparent substance 13, it becomes possible to dope semiconductor ultra-fine particles 12 of uniform grain size homogeneously in an optically transparent substance 13.

The inventors found that when forming this island structure the grain size can be controlled to be a desired size according to the conditions of growth and that the size can be made relatively homogeneously.

The grain size of ultra-fine particles can be controlled by substrate temperature and deposition time. For example, if the deposition of CdS is started by keeping the substrate temperature between 200°–400° C., nothing is deposited at first, then island particles are grown and a film is gradually formed.

The inventors also found that it is also possible to increase the density of islands in a part on the substrate 11 wherein an island structure is grown, and that it is easy to increase the density to be 10% or more of the plane of the substrate 11.

It is preferable that the semiconductor to be grown as ultra-fine particles is a I-VII group compound such as CuCl, a II-VI group compound such as CdS, CdSe, CdO, CdTe, ZnSe, ZnO, ZnTe or HgTe, a mixed crystal II-VI group compound such as CdSSe or HgCdTe, a III-V group compound such as GaAs, GaN, GaP, GaSb, InAs, InP, InSb, GaAlAs or InAlAs, or a IV group semiconductor such as Si or Ge.

As an optically transparent substance 13, any material which is optically transparent in a wavelength range necessary to obtain nonlinear optical characteristics can be used, and either an inorganic glass material or an organic polymer compound is available.

Examples for manufacturing the structure shown in FIG. 1 will be explained below.

EXAMPLE 1

Figure 2:
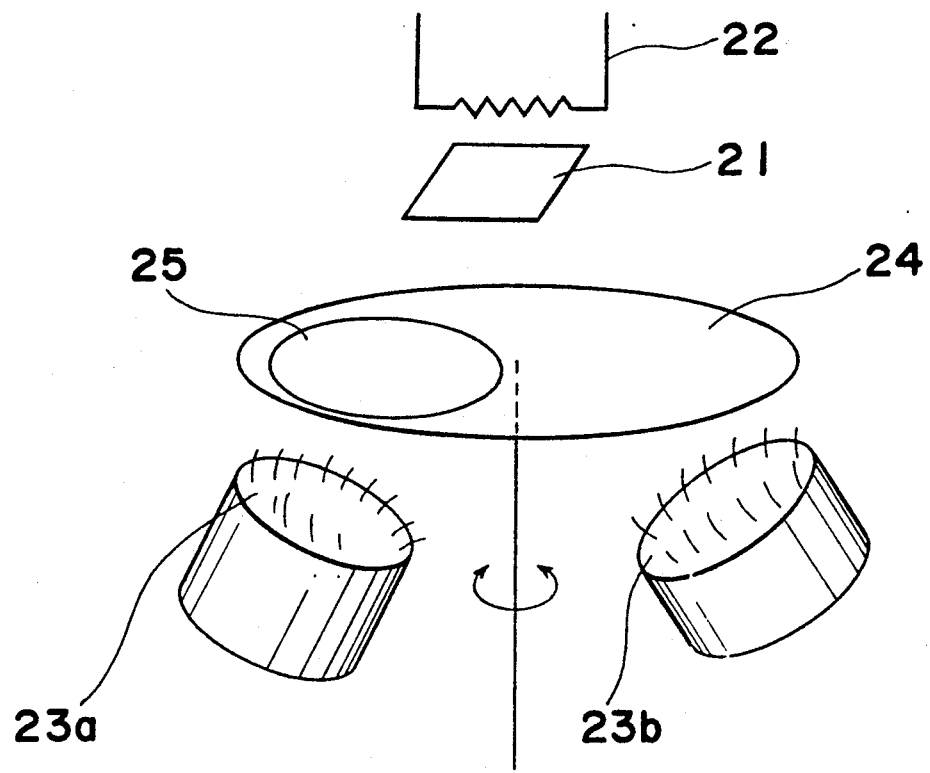
FIG. 2 is a schematic perspective view which shows the construction of an apparatus for manufacturing a nonlinear, optical thin-films.

A multi-target sputtering system shown in FIG. 2 is used for manufacturing nonlinear, optical thin-films. Two sputtering sources, that is, an $SiO_2$ glass target 23a and a CdS target 23b are used. A shutter 24 having an aperture 25 is disposed between a substrate 21 and a target 23a or 23b. By rotating the shutter 24, the position of the aperture can be changed to be located over either of the targets. The position of the aperture 25 and the stop time are controlled by a computer (not shown). The substrate 21 is made of $SiO_2$ glass.

The deposition conditions are as follows: The gas pressure of argon environment is 1 Pa, the temperature of the substrate 21 is 200° C. controlled by a heater 22 and the input electric power for the $SiO_2$ glass target 23a and for the CdS target 23b are 100 W and 10 W, respectively.

First, in order to make the roughness of the surface of the substrate 21 even by covering the surface by an $SiO_2$ film, the aperture 25 is stopped over the silica glass target 23a, and an $SiO_2$ film of 50 nm thickness is deposited.

Next, the aperture 25 is stopped over the CdS target 23b, and CdS ultra-fine particles are deposited. The density of nuclei increases rapidly with increasing time, the size of crystal nuclei increases, an island structure is formed, and the island structure grows. When the size of semiconductor ultra-fine particles grown as islands becomes four to six nanometers, the shutter 24 is rotated again to stop over the silica glass target 23a, and an $SiO_2$ film of thickness about six nanometers is deposited.

By iterating the operations of irradiating $SiO_2$ and CdS on the substrate 21 in turn, a structure is formed wherein CdS ultra-fine particles grown as islands and an $SiO_2$ film are deposited alternately.

By iterating the operations two hundred times, nonlinear, optical thin-films of twenty five micrometers thickness is produced.

The amount of CdS doped in the thin-films is ten weight percent.

The band gap obtained from absorption spectra of the nonlinear, optical thin-films is shifted by 0.3 eV to the blue side when compared with a bulk semiconductor. Therefore, it is found that the semiconductor particles become quantum dots.

EXAMPLE 2

Figure 3:
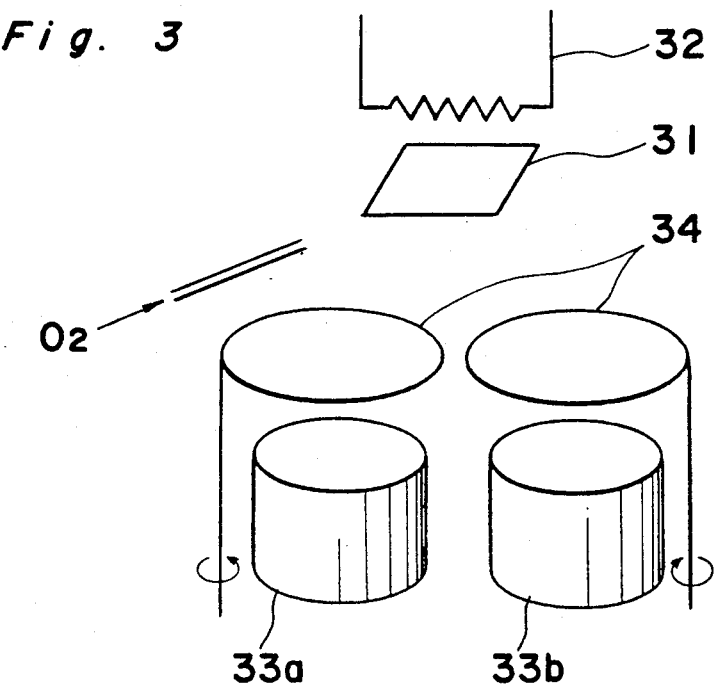
FIG. 3 is a schematic perspective view which shows the construction of another apparatus for manufacturing a nonlinear, optical thin-films.

An evaporation apparatus having a plurality of evaporation sources shown in FIG. 3 is used for manufacturing nonlinear, optical thin-films. $SiO_x$ ($1 \leq x \leq 2$) is enclosed in a first evaporation source 33a, while CdS is in a second one 33b. Shutters 34 are disposed between a substrate 31 and each of the evaporation sources 33a and 33b, and the particles irradiating the substrate 31 can be controlled by opening or closing the shutters 34. The opening and closing is controlled by a computer (not shown).

The substrate 31 is made of $SiO_2$ glass. The substrate 31 is fixed to a copper plate cooled by water in order to prevent the rise of the substrate temperature owing to radiant heat from the evaporation source. The substrate temperature is controlled to be 200° C. with a heater 32.

First, oxygen gas is introduced to provide $10^{-1}$ Pa of oxygen environment in the apparatus, and $SiO_x$ is evaporated from the evaporated source 33a to deposit an $SiO_2$ film of fifty nanometers on the substrate 31. Next, the introduction of oxygen gas is stopped, and high vacuum of $10^{-4}$ Pa or less is realized. Then, CdS from the evaporation source 33b is evaporated to the substrate 31 to deposit CdS island-structure fine particles. The growth is stopped when the size of CdS fine particles becomes four to six nanometers. Then, oxygen gas is introduced, and $SiO_x$ is evaporated from the evaporation source 33a to deposit a $SiO_2$ film of about six nanometers thickness.

By iterating the operations of depositing CdS ultra-fine particles and a $SiO_2$ film in turn, a structure wherein CdS ultra-fine particles are doped in a $SiO_2$ film is manufactured. By iterating the operations two hundred times, nonlinear, optical thin-films of about 1.25 micrometers thickness is produced.

The amount of the doped CdS in the nonlinear, optical thin film is ten weight percent.

The band gap obtained from absorption spectra of the nonlinear, optical thin-films is shifted by 0.3 eV to the blue side when compared with a bulk semiconductor. Therefore, it is found that the semiconductor particles become quantum dots.

EXAMPLE 3

An optical bi-stabilized device is manufactured by using nonlinear, optical thin-films manufactured by a method explained in Example 1.

A laser beam ($N_2$ excited pigment laser beam) of wavelength 430 nm is introduced into the device from the side of the silica glass substrate of the device.

Figure 4:
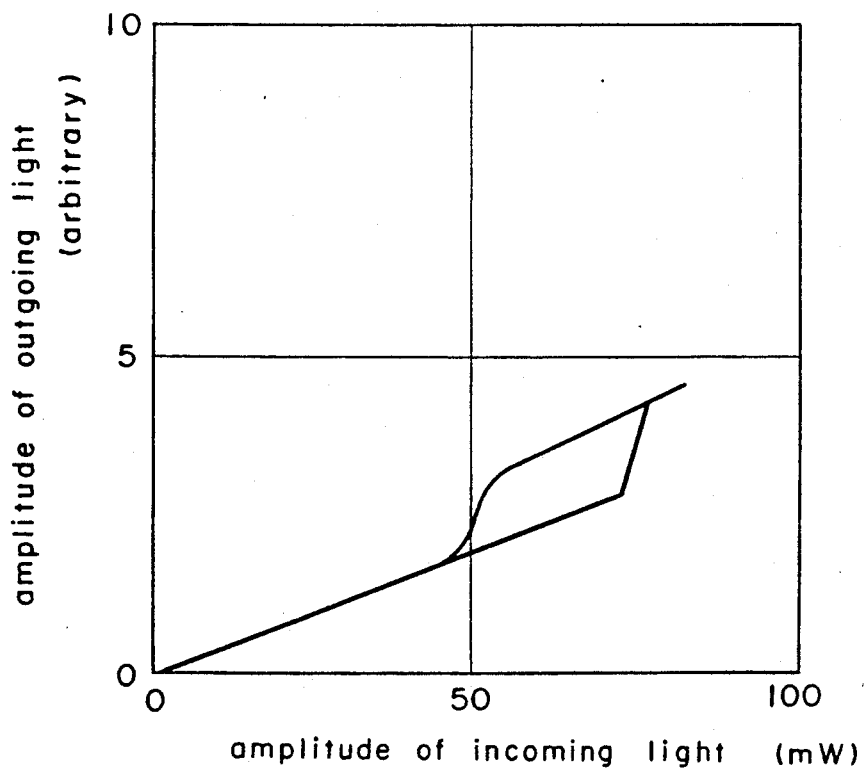
FIG. 4 is a graph of a bistable characteristic of a bistable element which uses nonlinear, optical thin-films according to the present invention.

Then, the relation between the amplitude of the incoming light and that of outgoing light is measured at 25° C. The data show bi-stabilized characteristics as shown in FIG. 4.

As mentioned above, nonlinear, optical thin-films according to the present invention have an island structure of semiconductor ultra-fine particles and an optically transparent substance deposited alternately, and the semiconductor ultra-fine particles of uniform grain size in the optically transparent substance, homogeneous and at a high doping density. Therefore, such nonlinear, optical thin-films can have a large nonlinear optic effect.

Further, it is possible to manufacture a device such as an optical bi-stabilized device having nonlinear, optical thin-films according to the present invention.

The invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. Nonlinear, optical thin-films comprising a plurality of island structures of semiconductor ultra-fine particles and a plurality of continuous films of an optically transparent material, said island structures and said continuous films being applied alternately on a substrate.

2. The nonlinear, optical thin-films according to claim 1, wherein a length of semiconductor ultra-fine particles in a direction perpendicular to the substrate plane is equal to or less than that of continuous film in a direction perpendicular to the substrate plane.

3. The nonlinear, optical thin-films according to claim 1, wherein the size of said semiconductor ultra-fine particles is larger than the Bohr radius of excitons and small enough to realize the quantum size effect substantially.

4. A method for manufacturing nonlinear, optical thin-films comprising the steps of:
   (a) providing a substrate;
   (b) depositing an island structure of semiconductor ultra-fine particles on the substrate or a continuous film; and
   (c) depositing the continuous film of optically transparent substance on the island structure;
   (d) the steps (b) and (c) of depositing an island structure and the continuous film being performed alternately.

5. The method according to claim 4, wherein in the step of depositing an island structure, the size of semiconductor ultra-fine particles is controlled by substrate temperature and deposition time.

6. The method according to claim 4, wherein a length of continuous film in a direction perpendicular to the substrate plane is controlled to be equal to or larger than that of semiconductor ultra-fine particles in a direction perpendicular to the substrate plane.

7. The method according to claim 4, wherein a deposition apparatus is used for deposition in said steps of depositing an island structure and the continuous film, and the island structure is formed by ultra-fine particles grown in the deposition process.

8. The method according to claim 7, wherein said deposition apparatus is an evaporation apparatus having two evaporation sources for the semiconductor material and for the optically transparent material.

9. The method according to claim 7, wherein said deposition apparatus is a multi-target sputtering system having targets for the semiconductor material and for the optically transparent substance.

* * * * *